April 9, 1963  C. K. ALEXANDER  3,084,945
HYDRAULIC POWER STEERING APPARATUS
Filed June 15, 1959
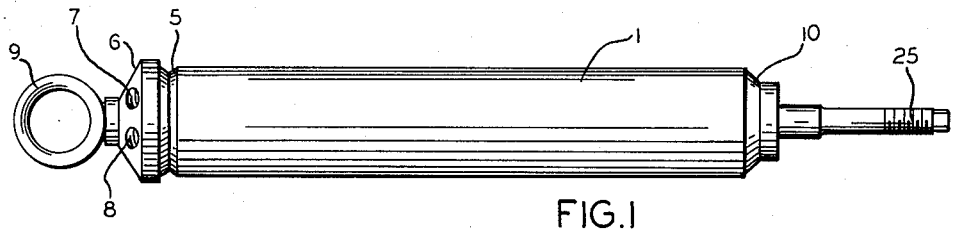
FIG.1
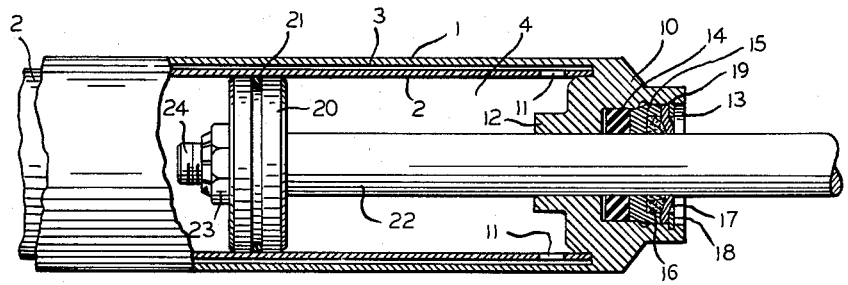
FIG.2
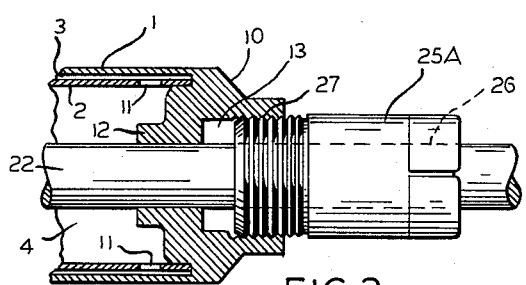
FIG.3
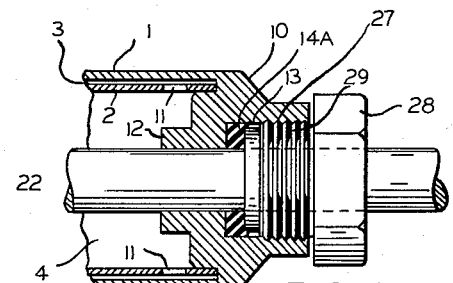
FIG.4
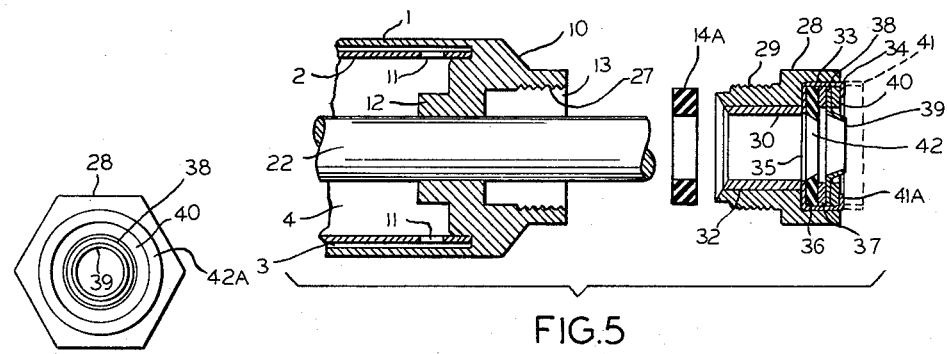
FIG.5
FIG.6
INVENTOR.
CHARLES K. ALEXANDER
BY
Chester M. Brown
ATTORNEY

United States Patent Office 3,084,945
Patented Apr. 9, 1963

3,084,945
HYDRAULIC POWER STEERING APPARATUS
Charles K. Alexander, 6437 Betsy Ross Place,
Milwaukee, Wis.
Filed June 15, 1959, Ser. No. 820,471
2 Claims. (Cl. 277—47)

This invention relates to improvements in hydraulically operated power steering apparatus for automobiles and more particularly to the fluid seal between relatively moving elements.

The hydraulically operated power steering apparatus installed in automobiles sold by the manufacturers is subject to considerable wear when in use which results in fluid leakage. No provision is made for effectively stopping this loss of fluid and as a consequence a complete new set of an expensive assembly is required.

Therefore, it is the principal object of this invention to provide a method of repair which may be adopted by the service man and thus make it possible to continue the use of the original equipment.

A further object is to provide an arrangement of elements which, with slight alteration of the standard equipment in the power steering apparatus, may be incorporated in the apparatus and thereby extend the useful life of the apparatus indefinitely.

Like parts are identified by the same reference numerals throughout the several views in the drawings, in which:

FIG. 1 is a side view of the apparatus for translating the fluid movement to the steering gear.

FIG. 2 is an enlarged fragmentary side view, partly in section, of the apparatus shown in FIG. 1.

FIG. 3 is a fragmentary sectional view illustrating a first step in repair operations.

FIG. 4 is a view similar to FIG. 3 showing the apparatus embodying the reconditioning elements.

FIG. 5 is a fragmentary sectional view illustrating the reconditioning elements prior to assembly as shown in FIG. 4.

FIG. 6 is an end view of the reconditioning elements as seen from the right relative to FIG. 6.

FIGS. 1 and 2 illustrate a translating apparatus as it is when embodied in the steering mechanism by the automobile manufacturer and I make no claim to any invention in it per se.

The apparatus as supplied by the manufacturer comprises outer and inner cylinders 1 and 2, respectively, which jointly define an outer annular cylindrical area or chamber 3 which is concentrically disposed about the inner cylindrical area or chamber 4 defined by the inner cylinder 2. The inner and outer cylinders 1 and 2 are closed at the end 5 against communication between the chambers 3 and 4, in any suitable manner, such as welding, not shown, by the closure member 6 which is provided with two ports 7 and 8, one of which communicates with the annular chamber 3 and the other of which communicates with the inner chamber 4. An eye 9 integral with the member 6 provides a swivel mounting for the apparatus.

The opposite ends of the cylinders 1 and 2 are closed by a centrally apertured bearing member 10. The outer annular chamber 3 and inner chamber 4 are placed in communication with each other by means of a plurality of apertures 11 in the inner cylinder 4 and adjacent the bearing member 10. The bearing member 10 is apertured co-axially with the cylinders 1 and 2 to provide a bearing portion 12 and an enlarged bore or threaded recess 13. A compressible resilient washer or seal 14 is positioned in the bottom of the bore 13. A dished annular ring 15 engages the washer. Packing 16 is disposed about dished ring and is retained therein by the washer 17 which in turn is held in compressive relation to the packing 16, ring 15 and seal 14 by means of the expansible split ring 18 seated in the annular groove 19.

Slidable in the chamber 4 is a piston 20 grooved annularly at 21 to provide for a sealing ring, if desired. The piston is fixedly mounted on the piston rod 22 by means of a nut 23 threaded on the reduced end 24. As indicated, the rod 22 extends to the exterior of the apparatus, through the bearing member 10, the washer 14 and packing 16 engaging the rod with sufficient pressure to prevent loss of fluid which fills the chambers 3 and 4. The outer end of the rod is threaded at 25 for engagement with steering apparatus, not shown.

The ports 7 and 8 are placed in communication with a control valve, not shown, for reversing the direction of flow of fluid in the chambers 3 and 4 or preventing such flow as the case may be during operation of the steering apparatus. Assuming the fluid to be flowing into the outer chamber 3 it will then pass into the chamber 4 and cause the piston 20 to move to the left relative to the views in the drawings and thus move the rod in a corresponding direction. When the direction of flow of the fluid is reversed, the piston 20 will move in the opposite direction and the rod 22 outwardly.

Obviously, when the described apparatus is operated under road conditions, the bearing portion 12, washer 15, packing 16 and rod 22 will become worn and ultimately permit the fluid in the apparatus to leak out and destroy the necessary balance between the power generating mechanism, not shown, and the described apparatus. As thus provided by the manufacturer, there is no provision made for compensating for this wear and as a result the user of the automobile must purchase an expensive complete new device for replacement.

Heretofore, the service man has had no way in which he could extend the life of the described apparatus and therefore, I have provided the means and method by which the worn apparatus may be reconditioned at an expense which is much more reasonable than that of purchasing a new apparatus. The means and the method are illustrated in FIGS. 3 through 6, inclusive.

The first step in the repairing procedure is the removal of the split ring 18, washer 17, packing 16, dished ring 15 and washer 14. The next step is to mount on the rod 22 a tap 25A having a bore 26 which freely bears on the rod and rotating it to cut threads 27 in the enlarged bore 13 in the bearing member 10. When the threads have thus been cut, the tap 25A is then removed from the rod 22, and a new resilient compressible washer 14A is mounted on the rod and moved to the bottom of the enlarged bore 13. I then provide a bushing nut 28 having threaded shank 29 complementary to the threads 27 in the bearing member 10 and provided with an axial bore receiving a cylindrical bushing 30 in press fit engagement with the bore. The inner diameter of the bushing 30 freely receives the rod 22 but with sufficient snugness to virtually eliminate lateral movement of the rod. The outer end of the bore 32 in the nut 28 terminates in an enlarged portion 33. Within this enlarged bore or portion 33 is mounted a dished receptacle 34 having a central aperture 35 of a diameter substantially equal to that of the inner diameter of the bushing 30. As indicated by the broken lines in FIG. 5, the wall of the receptacle 34 is cylindrical when inserted in the enlarged bore 33. When the receptacle is inserted, a resilient compressible washer or wiper 36, a metal washer or ring 37, a metal washer or scraper 38 having a resilient truncated conical portion 39 and a second metal washer or ring 40 are inserted in the receptacle 34 in the order named and the outer end or rim 41, shown in broken lines, is then formed radially inward at 41A of the bore 33 to compressibly engage the elements 36, 37, 38 and 40. It will, of course, be understood by those skilled in the art, that receptacle 34 will fit sufficiently tight in the enlarged bore 33 to prevent its removal during normal usage.

It will be noted that the inner margin of the washer 36 is beveled at 42. This provides a wiping area which prevents dirt from entering the apparatus. Also the cone-like portion 39 on the washer 38 will engage the rod 22 with sufficient pressure to prevent dirt from entering the apparatus. When the bushing nut 28 engages the washer 14A as shown in FIG. 4, the washer 14A will be expanded radially inwardly into firm sealing engagement with the rod 22. Obviously the pressure of the washer 14A on the rod 22 may be gauged by the amount of rotation of the nut 28.

Another desirable feature of my invention resides in the fact that, in the event the bushing 30 and the other parts carried by the bushing nut 28, as well as the washer 14A, become worn, they may be easily replaced by new elements without further alteration of the bearing member 10 or bushing nut 28.

Although I have disclosed a specific embodiment of my invention, it will be understood by those skilled in the art that various modifications may be made without departing from the spirit of the invention. Therefore, the appended claims are to be interpreted as liberally as the prior art justifies, unless the terms thereof are obviously limited in view of the foregoing disclosure.

I claim as my invention:

1. In hydraulic power steering apparatus including a bearing member reciprocably receiving a piston rod having an enlarged recess concentric with said rod, said recess opening into one end of said bearing member and including an internally threaded portion thereat, an annular, resilient seal circumposed about said rod and seated in said recess inwardly of said internally threaded portion, a bushing nut having an externally threaded shank removably received in said internally threaded portion and terminally engaging said resilient seal and expanding it radially inwardly into sealed engagement about said rod, said bushing nut including an axial bore including a first portion having a uniform diameter reciprocably receiving said rod and providing a bearing for said rod and a second portion having a uniform diameter greater than that of said first portion immediately adjacent said first portion and opening into the outer surface of said bushing nut, and a scraper assembly frictionally retained in said second portion and comprising an annular receptacle including opposed radial flanges having disposed in clamped relation therebetween, in order, a resilient wiper immediately adjacent said first portion and including a beveled wiping edge engaged about said piston rod and directed toward the outer surface of said nut, a first metal ring, a metal scraper including a resilient, axially projecting truncated conical portion frictionally engaged about said rod and terminating beyond the outer surface of said nut for scraping the major portion of foreign matter from said rod, and a second ring engaged by the outermost radial flange of said receptacle, the beveled wiping edge of said resilient wiper and said truncated conical portion preventing substantially all foreign matter from contacting said first portion and said resilient seal, and the radial expansion of said resilient seal being adjusted by the axial adjustment of said bushing nut in the threaded portion of said bearing member recess.

2. The structure of claim 1 in which said first uniform diameter portion of the axial bore of said bushing nut includes a cylindrical bushing seated therein for guidingly supporting the piston rod.

References Cited in the file of this patent

UNITED STATES PATENTS

| | | |
|---|---|---|
| 1,811,735 | Van Bezel | July 23, 1931 |
| 2,049,366 | Gardner | July 28, 1936 |
| 2,368,137 | Harmon | Jan. 30, 1945 |
| 2,379,162 | Laird | June 26, 1945 |
| 2,407,904 | Rosan | Sept. 17, 1946 |
| 2,417,799 | Seaver | Mar. 18, 1947 |
| 2,490,566 | Wishart | Dec. 6, 1949 |
| 2,594,810 | Schaub | Apr. 29, 1952 |
| 2,621,398 | Simmons | Dec. 16, 1952 |
| 2,772,105 | Wyse | Nov. 27, 1956 |
| 2,831,714 | Thorburn | Apr. 22, 1958 |
| 2,857,213 | Meier | Oct. 21, 1958 |

FOREIGN PATENTS

| | | |
|---|---|---|
| 441,732 | Great Britain | Jan. 24, 1936 |
| 1,068,109 | France | Feb. 3, 1954 |